US006599973B1

(12) United States Patent
Visscher et al.

(10) Patent No.: US 6,599,973 B1
(45) Date of Patent: Jul. 29, 2003

(54) AQUEOUS GRAFT COPOLYMER PIGMENT DISPERSANTS

(75) Inventors: Karyn B. Visscher, Voorhees, NJ (US); Patrick F. Mc Intyre, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 107 days.

(21) Appl. No.: 09/670,359

(22) Filed: Sep. 27, 2000

(51) Int. Cl.7 .......................... C08L 51/00; C08L 51/08
(52) U.S. Cl. ................. 524/504; 524/413; 524/425; 524/430; 524/431; 524/441; 524/445; 524/451; 524/533; 524/535; 524/547; 524/556; 524/558
(58) Field of Search ................. 524/504, 556, 524/558, 533, 535, 547, 413, 425, 430, 431, 441, 445, 451

(56) References Cited

U.S. PATENT DOCUMENTS

| | | | |
|---|---|---|---|
| 4,273,888 A | * | 6/1981 | Graetz .................... 525/31 |
| 4,680,352 A | | 7/1987 | Janowicz et al. |
| 4,722,984 A | | 2/1988 | Janowicz |
| 5,064,900 A | * | 11/1991 | Iwai et al. ................ 523/522 |
| 5,179,158 A | * | 1/1993 | Azuma et al. ............. 524/745 |
| 5,231,131 A | | 7/1993 | Chu et al. |
| 5,272,201 A | | 12/1993 | Ma et al. |
| 5,502,113 A | * | 3/1996 | Antonelli et al. ........... 524/401 |
| 5,708,095 A | | 1/1998 | Grezzo Page et al. |
| 5,942,243 A | * | 8/1999 | Shah ....................... 424/434 |
| 6,107,392 A | * | 8/2000 | Antonelli et al. ........... 524/504 |
| 6,262,152 B1 | * | 7/2001 | Fryd et al. ................. 523/205 |

* cited by examiner

Primary Examiner—Judy M. Reddick
(74) Attorney, Agent, or Firm—Steven C. Benjamin

(57) ABSTRACT

A polymeric dispersant for pigments based on an acrylic graft copolymer wherein the graft copolymer has a weight average molecular weight of about 5,000–100,000 and comprises a hydrophobic polymeric backbone and discrete anionic and nonionic hydrophilic side chains attached to the backbone. These graft copolymers are useful as dispersants in aqueous systems, and are particularly useful in formulating exterior water borne coatings for automobiles and trucks.

17 Claims, No Drawings

AQUEOUS GRAFT COPOLYMER PIGMENT DISPERSANTS

BACKGROUND OF THE INVENTION

This invention relates to novel graft copolymers having mixed anionic and nonionic side chains. The invention also relates to their use as pigment dispersants in aqueous dispersions and water borne coating compositions.

Water-dispersible polymers which are effective for dispersing pigment particles in aqueous medium are well known in the art and have been used to form aqueous pigment dispersions useful in formulating water borne coating compositions. Nowadays, such pigment dispersions are widely used, for example in exterior water borne paints for automobiles and trucks.

Aqueous pigment dispersions are generally stabilized and maintained, in a dispersed state, by either a nonionic or ionic technique. When the nonionic technique is used, the pigment particles are stabilized by a dispersant polymer having a nonionic hydrophilic section that extends into the water medium, providing entropic or steric stabilization of the pigment particles against flocculation. While these nonionic polymers provide good dispersing action, the major disadvantage with the nonionic technique is that the final coating film is water sensitive and therefore susceptible to softening and poor adhesion with an overlying water borne clear coat.

In the ionic technique, the pigment particles are stabilized using a polymer of an ion containing monomer, such as neutralized acrylic and methacrylic acid, as for example, as taught in U.S. Pat. No. 5,231,131 to Chu et al issued Jul. 27, 1993. These polymers provide stabilization mainly through a charged double layer mechanism whereby ionic repulsion hinders the particles from flocculation. Since the neutralizing component evaporates upon curing of the coating film, the polymer then becomes no longer water soluble and the final coating film is therefore not water sensitive. Yet, the major disadvantage with the ionic technique is that water borne coatings typically contain organic cosolvents along with water to adjust the physical properties. As the coating cures, the concentration of such solvents increases as water evaporates, which in turn jeopardizes the stability of the pigment dispersion needed to obtain high glamour and color quality demanded by an exterior automotive finish.

To obtain a balance of properties with existing polymeric dispersants has been very difficult. Optimum water sensitivity and dispersion stability has been hard to achieve.

Other problems with waterborne coating compositions are as follows: the pigment dispersion used to form the composition often is not completely compatible with the film forming binder constituents of the composition; the polymeric dispersant does not uniformly disperse the pigments and the pigments flocculate or agglomerate; or the dispersant does not enter into the curing reaction and remains in the film as an unwanted component which may later leach out or cause deterioration of the resulting finish.

A polymeric dispersant is needed that will form an aqueous pigment dispersion that is stable and non-flocculated or agglomerated, will provide optimum dispersibility and water sensitivity, and is compatible with a variety of polymeric film forming binders conventionally used in water borne coating compositions, and will cure with the film to form a finish of automotive quality that does not deteriorate on weathering because of adverse properties caused by the presence of the polymeric dispersant.

SUMMARY OF THE INVENTION

The present invention provides a composition suitable for use as a polymeric pigment dispersant based on an acrylic graft copolymer wherein the graft copolymer has a weight average molecular weight of about 5,000-100,000 and comprises a hydrophobic polymer backbone and discrete anionic and nonionic hydrophilic side chain(s) attached to the backbone wherein (1) the polymer backbone is hydrophobic in comparison to the side chains and is formed from polymerized hydrophobic (meth)acrylic monomers and contains up to 30% by weight, based on the total weight of the backbone, of polymerized monomers having functional groups that enhance the pigment binding force;

(2) the anionic side chain(s) are anionic hydrophilic (meth)acrylic macromonomers that are attached to the backbone at a single terminal point and are formed from polymerized (meth)acrylic monomers and contain about 2–100% by weight, based on the total weight of the anionic side chain(s), of polymerized acid containing monomers and have a weight average molecular weight of about 1,000–10,000, preferably 2,000–5,000;

(3) the nonionic side chain(s) are nonionic hydrophilic poly(alkylene glycol) (meth)acrylic macromonomers that are attached to the backbone at a single terminal point and are represented by the formula $$CH_2=C(R^1)C(O)O[-Q-]_n-R^2$$

wherein $R^1$ is H or $CH_3$, $R^2$ is H or an alkyl group of 1 to 4 carbon atoms, Q is $-CH_2CH_2O-$, $-CH(CH_3)CH_2O-$, or a combination thereof, and n is about 10–100 and have a weight average molecular weight of about 500–4,000, preferably about 1,000–2,000; and wherein the acid groups of the graft copolymer are neutralized with an inorganic base or amine.

The present invention also provides stable and non-flocculating aqueous pigment dispersions containing dispersed pigment, an aqueous carrier medium and the graft copolymer dispersant of this invention. These dispersions are particularly useful in formulating high performance water borne coating compositions and in particular water borne color coat or base coat compositions for clear coat/color coat finishes for automobiles and trucks.

DETAILED DESCRIPTION OF THE INVENTION

The novel graft copolymer of this invention has a hydrophobic backbone that binds to pigment surfaces, and a unique combination of hydrophilic anionic side chain(s) and hydrophilic nonionic side chain(s) that are soluble in the aqueous carrier medium and keep the pigments dispersed. The use of mixed side chains or "arms" provides broader solubility characteristics and utility as a pigment dispersant in high performance water borne coatings.

The graft copolymer of this invention is also compatible with a variety of polymeric film forming binders that are conventionally used in waterborne coating compositions and in particular are compatible with acrylic polymers that are widely used in waterborne coatings. In addition, aqueous pigment dispersions formed from such graft copolymers are stable and in general nonflocculated or agglomerated, even upon curing of the coating formed therefrom. The graft copolymer of this invention also upon curing of the coating, reacts with other film forming components of the coating composition and becomes part of the film and does not cause deterioration of the film upon weathering as may occur if it was an unreacted component of the film.

All molecular weights referred herein are determined by GPC (gel permeation chromatography) using a polystyrene standard. The term (meth)acrylic refers to both acrylic and methacrylic compounds. The term (meth)acrylate refers to both methacrylate and acrylate esters.

The graft copolymer of this invention contains about 50–90% by weight of polymeric backbone and correspondingly about 10–50% of side chains. The graft copolymer has a weight average molecular weight of about 5,000–100,000, preferably about 10,000–40,000 and more preferably about 10,000–20,000. The weight ratio of anionic side chain(s) to nonionic side chain(s) contained in the graft copolymer is in the range of about 10:90 to 90:10, preferably 30:70 to 70:30, and typically 50:50.

The backbone portion of the graft copolymer is hydrophobic relative to the side chains and is formed primarily from polymerized ethylenically unsaturated hydrophobic monomers and preferably hydrophobic (meth)acrylic monomers as are listed hereinafter and can, and preferably does, contain up to 30% by weight, preferably 10–20% by weight, based on the weight of the backbone, of polymerized monomers having functional groups, known as pigment anchoring groups, that enhance the pigment binding force.

Preferred hydrophobic monomers that can be used to form the backbone include alkyl acrylates, cycloaliphatic acrylates and aromatic acrylates. Typical alkyl acrylates have 1–18 carbons in the alkyl group such as methyl acrylate, ethyl acrylate, propyl acrylate, isopropyl acrylate, n-butyl acrylate, isobutyl acrylate, t-butyl acrylate, pentyl acrylate, hexyl acrylate, 2-ethyl hexyl acrylate, nonyl acrylate, lauryl acrylate, and the like. Cycloaliphatic acrylates can be used such as cyclohexylacrylate, trimethylcyclohexyl acrylate, t-butyl cyclohexyl acrylate, and the like. Aromatic acrylates such as benzyl acrylate and phenyl acrylate also can be used. Other polymerizable monomers (up to 30% by weight, preferably 10–20% by weight, based on the weight of the backbone) can also be used for forming the backbone such as alkyl methacrylates, cycloaliphatic methacrylates, and aromatic methacrylates as are listed hereinafter. Apart from the (meth)acrylic monomers mentioned above, other ethylenically unsaturated monomers can also be used such as styrene, a-methyl styrene, vinyl acetate, vinyl butyrate, and the like, although a graft copolymer made from all (meth) acrylic monomers is generally preferred herein.

The functional or pigment anchoring groups that are built into the hydrophobic backbone may vary depending on the type of pigment being dispersed. For example, monomers with amino groups, such as dimethyl amino ethyl acrylate, diethyl amino ethyl acrylate, t-butyl amino ethyl acrylate, and the like can be incorporated in the hydrophobic backbone to bind with pigments having acidic groups on their surface. Monomers with acid groups such as acrylic acid, methacrylic acid, or 2-acrylamido-2-propane sulfonic acid, and the like can be incorporated in the hydrophobic portion to bind with basic pigment surfaces. Other similar functional anchoring groups can also be used to attach to copolymer to the pigment surface.

The hydrophobic backbone described above has affinity for the pigment surface and is designed to anchor the graft copolymer to the pigment surface, while the side chains of the graft copolymer are designed to be soluble and extend in the selected aqueous carrier medium and keep the pigments dispersed. The side chains of the present invention are formed from a mixture of discrete anionic and nonionic hydrophilic macromonomers that are polymerized into the backbone. Having both ionic and nonionic functionality in the side chains provides an optimum balance of dispersibility and water sensitivity.

The nonionic side chain(s) useful in the practice of this invention are formed from hydrophilic poly(alkylene glycol) containing ethylenically unsaturated macromonomers that have 1 to 4 carbon atoms in each alkylene group which may be the same or different, and that have a weight average molecular weight of about 250–10,000, preferably 500–4,000 and more preferably 550–2,000. The nonionic macromonomers useful in this invention contain only one terminal double bond which is polymerized into the backbone of the graft copolymer. Preferred nonionic macromonomers useful in the practice of this invention are poly(ethylene and/or propylene glycol) containing (meth)acrylic macromonomers that are represented by the formula described above. These macromonomers are typically formed by polymerizing one or more nonionic alkylene oxide monomer(s) in the presence of an ethylenically unsaturated acid monomer, in particular (meth)acrylic acid. The nonionic macromonomers can contain a hydroxyl group at the terminus opposite the polymerizable double bond to provide a further reactive site separated from the polymeric backbone that is capable of reacting with the film forming components present in the coating composition, which, in turn, enable the dispersant to become a permanent part of the final film network. Otherwise, they contain an alkyl ether group at the terminus opposite the double bond which improves its solubility in water.

Particularly preferred nonionic macromonomers useful in the practice of the present invention are poly(ethylene glycol) mono(meth)acrylates represented by the general formula

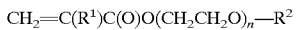

where $R^1$=H or $CH_3$, $R^2$=H or $CH_3$, and n is about 10–100 and have a weight average molecular weight of about 550–4,000, preferably about 1,000–2,000. Typical examples include methoxy poly(ethylene glycol) monomethacrylate (weight average molecular weight 550–2,000) and poly (ethylene glycol) monomethacrylate (weight average molecular weight 550–2,000). Such polymers are commercially available from ISC (International Specialty Chemicals) and other sources. Alternatively, these nonionic macromonomers can be prepared using conventional techniques well known to those skilled in the art The anionic side chain(s) useful in the practice of the present invention are formed from hydrophilic acid functional macromonomers that have a weight average molecular weight of about, 1,000–10,000 and preferably about 2,000–5,000. These macromonomers, similar to the above macromonomers, also contain only one terminal double bond which is polymerized into the backbone of the graft copolymer. The anionic macromonomer is formed from polymerized ethylenically unsaturated monomers, preferably polymerized (meth)acrylic monomers. Generally it contains about 2 to 100% by weight, more preferably about 10–30% by weight, based on the weight of the anionic macromonomer, of polymerized hydrophilic acid containing monomers. Methacrylic acid is preferred acid monomer particularly if it is the sole constituent. Other acid containing monomers that can be used are ethylenically unsaturated carboxylic acids, such as acrylic acid, 2-acrylamido-2-propane sulfonic acid, and the like. In addition to the forgoing acid monomers, other commonly used ethylenically unsaturated hydrophobic monomers, preferably (meth) acrylic monomers, can be, and preferably are, copolymerized into the hydrophilic anionic portion, provided they are used at a concentration that will not drastically change the solubility properties of this portion in the selected aqueous carrier medium. Preferred monomers include the alkyl methacrylates, cycloaliphatic methacrylates, and aromatic methacrylates as are listed hereinafter.

Typical alkyl methacrylates that can be used have 1–18 carbon atoms in the alkyl group such as methyl methacrylate, ethyl methacrylate, propyl methacrylate, isopropyl methacrylate, n-butyl methacrylate, isobutyl methacrylate, t-butyl methacrylate, pentyl methacrylate, hexyl methacrylate, 2-ethyl hexyl methacrylate, nonyl methacrylate, lauryl methacrylate, stearyl methacrylate, and the like. Cycloaliphatic methacrylates also can be used such as cyclohexyl methacrylate, trimethylcyclohexyl methacrylate, t-butyl cyclohexyl methacrylate, isobornyl methacrylate, and the like. Aromatic methacrylates also can be used such as benzyl methacrylate, phenyl methacrylate, and the like. Other polymerizable monomers that can be used are the alkyl acrylates, cycloaliphatic acrylates, and aromatic acrylates as are listed hereinabove, along with other commonly used ethylenically unsaturated monomers.

The anionic side chain(s) can, and preferably do, also contain up to 30% by weight, based on the total weight of the anionic side chain(s), of hydrophilic (meth)acrylic monomers that have functional groups that will react with the film forming components present in the coating composition which, in turn, enable the dispersant to become a permanent part of the final network structure. Suitable monomers include hydrophilic hydroxyl alkyl (meth) acrylate monomers having 1 to 4 carbon atoms in the alkyl group, such as hydroxy ethyl acrylate, hydroxy ethyl methacrylate, hydroxy propyl acrylate, and hydroxy propyl methacrylate, and the like. If desired, these functional groups can also be placed in the backbone.

In the practice of the present invention, although their lengths may vary, the nonionic and anionic side chains should generally be around the same length for optimal stabilization of the pigment particle.

The graft copolymer of this invention is preferably prepared by the copolymerization of the backbone monomers in the presence of both the anionic and nonionic macromonomers. The macromonomers, which become the side chains of the graft copolymer, are usually prepared first. They are then reacted with the monomers chosen for the backbone composition to form the graft copolymer. The graft copolymer is ultimately neutralized with an amine or base to aid in dispersing the polymer in the selected aqueous carrier medium.

In the present invention, the anionic macromonomers are preferably prepared first by free radical polymerization in the presence of a catalytic cobalt chain transfer agent containing a $Co^{+2}$ group, a $Co^{+3}$ group, or both, to ensure that the resulting macromonomer only has one terminal double bond which will polymerize with the backbone monomers. The polymerization is carried out in an organic solvent or solvent blend using conventional polymerization initiators. Typically, in the first step of the process, the monomers chosen for the anionic macromonomer composition are blended with an organic solvent which is water miscible or water dispersible and a cobalt chain transfer agent and heated to the reflux temperature of the reaction mixture. In subsequent steps additional monomers and cobalt catalyst and conventional azo or peroxide type polymerization initiators are added and polymerization is continued at the reflux temperature for about 4–8 hours until an anionic macromonomer is formed of the desired molecular weight.

Preferred cobalt chain transfer agents are described in U.S. Pat. No. 4,680,352 to Janowicz et al and U.S. Pat. No. 4,722,984 to Janowicz. Most preferred are pentacyanocobaltate (II), diaquabis(borondifluorodimethyl-glyoximato) cobaltate(II) and diaquabis (borondifluorophenylglyoximato) cobaltate (II). Typically these chain transfer agents used at concentrations of about 5–1000 ppm based on the monomers used and the desired molecular weight.

After the anionic macromonomer is formed as described above, optionally solvent is stripped off and the backbone monomers are added to the anionic macromonomer along with nonionic macromonomer (commercially obtained), additional solvent and polymerization initiator, for preparation of the basic graft copolymer structure by conventional free radical polymerization. Polymerization is continued usually at the reflux temperature of the reaction mixture for about 4–8 hours until a graft copolymer is formed of the desired molecular weight.

Typical solvents that can be used to form the anionic macromonomer or graft copolymer are alcohols such as methanol, ethanol, n-propanol, and isopropanol, ketones such as acetone, butanone, pentanone, hexanone, and methyl ethyl ketone, alkyl esters of acetic, propionic, and butyric acids such as ethyl acetate, butyl acetate, and amyl acetate, ethers such as tetrahydrofuran, diethyl ether, and ethylene glycol and polyethylene glycol monoalkyl and dialkyl ethers such as cellosolves and carbitols, and glycols such as ethylene glycol and propylene glycol, and mixtures thereof.

Any of the commonly used azo or peroxy polymerization initiators can be used for preparation of the anionic macromonomer or graft copolymer provided it has solubility in the solution of the solvents and the monomer mixture, and has an appropriate half life at the temperature of polymerization. "Appropriate half life" as used herein is a half life of about 10 minutes to 4 hours. Most preferred are azo type initiators such as 2,2'-azobis(isobutyronitrile), 2,2'-azobis(2, 4-dimethylvaleronitrile), 2,2'-azobis(methylbutyronitrile), and 1,1'-azobis(cyanocyclohexane). Examples of peroxy based initiators are benzoyl peroxide, lauroyl peroxide, t-butyl peroxypivalate, t-butyl peroctoate which can also be used provided they do not adversely react with the cobalt chain transfer agents under the reaction conditions chosen for anionic macro monomers.

After the graft copolymer is formed, it is then neutralized with an amine or an inorganic base such as ammonia or sodium hydroxide and then water is added to form a neutralized polymer solution. Typical amines that can be used include amino methyl propanol, amino ethyl propanol, dimethyl ethanol amine, triethylamine and the like. One preferred amine is amino methyl propanol and the preferred inorganic base is ammonium hydroxide. It is also sometimes desirable to neutralize the anionic macromonomer before the backbone is formed to avoid possible reactions with the functional groups present in the backbone portion.

Particularly useful graft copolymers of the present invention include the following:

a graft copolymer having a backbone of polymerized n-butyl acrylate, methyl acrylate and up to about 10% by weight of acrylic acid for interaction with basic pigment surfaces, anionic side chains of an anionic macromonomer having a weight average molecular weight of about 2,000–5, 000 and containing about 50–70% by weight, based on the weight of the macromonomer, of polymerized methyl methacrylate and 20–30% by weight, based on the weight of the macromonomer, of polymerized methacrylic acid and 10–20% by weight hydroxy ethyl methacrylate, and nonionic side chains of a poly(ethylene glycol) monomethacrylate having a weight average molecular weight of about 1,000–2,000.

a graft copolymer having a backbone of polymerized methyl acrylate and butyl acrylate, benzyl methacrylate for interaction with aromatic pigments, and up to about 30% by weight, based on the weight of the backbone, of dimethyl amino ethyl methacrylate for interaction with acid groups on pigment surfaces, and side chains of the anionic and nonionic macromonomers described above.

The dispersants of this invention are useful in making aqueous pigment dispersions and mill bases for paints and other coatings. To form a pigment dispersion or a mill base, pigments are added to a neutralized solution of the graft copolymer in the customary aqueous carrier medium and then are dispersed using conventional techniques such as high speed mixing, ball milling, sand grinding, attritor grinding, horizontal or vertical media mill grinding, or two or three roll milling. The resulting pigment dispersion has a pigment to dispersant binder weight ratio of about 0.1/100 to 2000/100.

Any of the conventional pigments used in paints can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, phthalocyanines, perylenes, azo pigment, and indanthrones carbazoles such as carbazole violet, isoindolones, thioindigio reds, and benzimidazolinones; and metallic flakes such as aluminum flake, pearlescent flakes, and the like.

It may be desirable to add other optical ingredients to the pigment dispersion such as antioxidants, flow control agents, UV stabilizers, light quenchers and absorbers, and rheology control agents such as fumed silica and microgels. Other film forming polymers can also be added such as acrylics, acrylourethanes, polyesters and polyester urethanes, alkyds, polyethers and polyether urethanes, and the like that are compatible with the pigment dispersion.

The pigment dispersion can be added to a variety of water borne coating or paint compositions such as primers, primer surfacers, topcoats which may be monocoats, or basecoats of a clearcoat/basecoat finish. These compositions may contain film-forming polymers such as hydroxy functional acrylic and polyester resins and crosslinking agents such as blocked isocyanates, alkylated melamines, polyisocyanates, epoxy resins, and the like. It is desirable to have the film-forming polymer of the coating composition be similar to the polymer of the pigment dispersion so that on curing the polymer of the pigment dispersion will cure with the coating polymer and become a permanent part of the film or coating by reacting with crosslinkers.

EXAMPLES

The following examples illustrate the invention. All parts and percentages are on a weight basis unless otherwise indicated. Molecular weights are determined by GPC using polystyrene as the standard.

Polymer Dispersant 1

Polymer Dispersant 1 is a graft copolymer of this invention which contains polymerized acrylic acid monomers in the backbone and 30% of the anionic stabilizing arms are polymerized acrylic monomers and 70% are nonionic polyether arms of Bisomer S20W. Bisomer S20W is a 2000 Mw nonionic macromonomer of methoxy poly(ethylene glycol) monomethacrylate which is purchased from ISC. Accordingly, this polymer has a blend of nonionic and anionic arms. Polymer Dispersant 1 had the following composition: [60] NBA/AA/MA (45/10/45)/[40] BMA/MMA/HEMA/MAA (40/28/12/20)/Bisomer S20W (30/70) and a weight average molecular weight of 15,500 and a number average molecular weight of 6500 and polydispersity of 2.4. Polymer Dispersant 1 was prepared in 3 steps. The first step is the formation of the anionic macromonomer. The second step is reacting the anionic macromonomer with the nonionic macromonomer and other constituents to form the macro branched copolymer. The anionic macromonomer is made by charging the following constituents into a reactor equipped with a thermometer, stirrer dropping funnels, reflux condenser and a nitrogen blanket. The third step is solids reduction with deionized water and neutralization.

Step 1

Anionic Macromonomer, BMA/MMA/HEMA/MAA (40/28/12/20)

The anionic macromonomer was prepared using the following components. Quantities are given in parts by weight.

|  | Parts by Weight |
| --- | --- |
| Portion 1 | |
| Methyl methacrylate ("MMA") | 64.69 |
| Butyl methacrylate ("BMA") | 92.41 |
| Hydroxyethyl methacrylate ("HEMA") | 18.48 |
| Methacrylic acid monomer ("MAA") | 30.80 |
| Isopropanol | 229.80 |
| Portion 2 | |
| Diaquabis(borondifluorodiphenyl-glyoximato) cobaltate(II), Co(DPG-BF$_2$) | 0.01 |
| Isopropanol | 18.76 |
| 2,2-azobis(2-methylbutyronitrile) (Vazo ® 67 by DuPont Co., Wilmington, DE) | 0.17 |
| Methyl ethyl ketone | 8.04 |
| Portion 3 | |
| Isopropanol | 15.60 |
| Portion 4 | |
| Methyl ethyl ketone | 24.06 |
| Isopropanol | 56.14 |
| Diaquabis(borondifluorodiphenyl-glyoximato) cobaltate(II), Co(DPG-BF$_2$) | 0.03 |
| 2,2-azobis(2-methylbutyronitrile) (Vazo ® 67 by DuPont Co., Wilmington, DE) | 2.20 |
| Portion 5 | |
| Methyl methacrylate | 46.20 |
| Butyl methacrylate | 61.61 |
| Hydroxyethyl methacrylate | 27.72 |
| Methacrylic acid | 46.20 |
| Total | 769.87 |

Portion I was charged to a 2-liter flask (equipped with a thermometer, stirrer, additional funnels, heating mantle, reflux condenser, and nitrogen blanket) and heated under a nitrogen blanket to its reflux temperature in about 20 minutes. Portion 2 was added as one shot and the composition was held at its reflux temperature for about 5 minutes. Portion 3 was used as a rinse for the container and lines from Portion 2. Portion 4 and 5 were added simultaneously while the reaction was held at reflux. The addition of Portion 4 took 330 minutes to complete and addition of portion 5 took 240 minutes to complete. After adding Portion 4 and Portion 5, the reaction continued for additional 15 minutes at reflux and then cooled to room temperature. The resulting macromonomer solution had the composition of 40% BA, 28% MMA, 12% HEMA, and 20% MAA. This macromonomer was then used below to form the graft copolymer. The macromonomer had a solids of 43.2% and the number molecular weight (Mn) was 1900 gm/mole and the weight average molecular weight (Mw) was 3300 gm/mole and the polydispersity was 1.74. The macromonomer was neutralized with 2-amino-2methyl-1-propanol (available as AMP-95 from Angus Chemical) prior to conducting the graft formation reaction.

Nonionic Macromonomer, Poly (Ethylene Glycol) Mono Methacrylate

The nonionic macromonomer is Bisomer S20W which is a 2000 Mw methoxy poly(ethylene glycol) monomethacrylate macromonomer purchased from ISC.

Step 2

Graft Copolymer

The graft copolymer was formed by charging a reactor equipped as above with the following constituents:

| | Parts by Weight |
|---|---|
| Portion I | |
| n-Butyl Acrylate ("NBA") | 19.51 |
| Acrylic Acid ("AA") | 3.86 |
| Methyl Acrylate ("MA") | 19.51 |
| Anionic Macromonomer (from above) | 110.99 |
| Nonionic Macromonomer (Bisomer S20W) | 258.96 |
| Isopropanol | 7.45 |
| Portion II | |
| Butyl Acetate | 15.34 |
| Benzoyl Peroxide | 0.37 |
| Portion III | |
| Isopropanol | 5.845 |
| Portion IV | |
| n-Butyl Acrylate | 143.06 |
| Acrylic Acid | 28.30 |
| Methyl Acrylate | 143.06 |
| Portion V | |
| Isopropanol | 10.50 |
| Portion VI | |
| 2,2,Azobis-(2,4-Dimethylvaleronitrile) (Vazo ® 52 by DuPont Co., Wilmington, DE) | 2.86 |
| Isopropanol | 41.29 |
| Methyl Ethyl Ketone | 10.65 |
| Portion VII | |
| Isopropanol | 8.47 |
| Total | 830.00 |

The reactor was inerted with nitrogen. Portion 1 was heated to reflux temperature over a 20 minute period. Portion 2 is the initiator solution and was charged to the reactor in 2 shots with 10 min hold. The reaction was held at reflux for 10 minutes. Portion 3 was rinse for Portion 2. Portion 4 was charged to monomer feed tank, mixed for 15 min, then fed to reactor over 180 minutes. Portion 5 was rinse for portion 4. Portion 6 is charge of initiator and solvents to initiator feed tank with feed to reactor over 240 minutes concurrent with Portion 4. Portion 7 is rinse for Portion 6.

| Step 3 Solids Reduction and Neutralization | |
|---|---|
| Portion 1 | |
| Deionized Water | 45.19 |
| Portion 2 | |
| Aminomethyl propanol | 6.07 |
| Step 3 Solids Reduction and Neutralization | |
| Portion 3 | |
| Deionized Water | 1.20 |
| Portion 4 | |
| Polymer Dispersant 1 | 47.54 |
| Total | 100.00 |

Portion 1 was charged to the reactor and agitated. Portion 2 was charged to reactor and mixed for 15 minutes. Portion 3 was rinse for portion 2. Portion 4 was fed to reactor over 90 min and mixed for 30 min, then fillout. The resulting branched copolymer solution had a 62% solids content and the polymer had the following composition: [70] NBA/AA/MA (45.5/09/45.5)//[30] {BMA/MMA/HEMA/MAA (40/28/12/20)}/Bisomer S20W (30/70) and a weight average molecular weight (Mw) of 17,000 and a number average molecular weight (Mn) of 6830 and polydispersity of 2.5.

Comparison Polymer Dispersant 2

Polymer Dispersant 2 is a graft copolymer dispersant made using the cobalt chain transfer method as described in the preparation of Polymer Dispersant 1 with the exception that the resulting graft copolymer solution had 100% anionic arms. The polymer solution is 30% solids and has the composition: [69] BA/MA/AA (45.5/45.5/9)//[31] MMA/MAA (71.25/28.75). Polymer Dispersant 2 was the control dispersing resin and represents the basepoint for existing technology.

Evaluation of Pigment Dispersion and Paint Properties

The pigment dispersion samples were prepared using the following procedure. Laboratory grinds were performed using standard laboratory 01 Attritors which are described in Paint Flow and Pigment Dispersion by Temple C. Patton, pages 439–441, Wiley Interscience Publication, 1979. Each grind sample was loaded with 700 grams of experimental dispersion for R-706 white, TiO2, formulations. Milling was accomplished with 850 grams of 0.8–1.0 mm high density zirconia media. Each attritor was milled for 1 hour for R-706 TiO2, white pigment, at 500 rpm spindle agitation to ensure that adequate milling was achieved.

Polymer Dispersant 2 was included in the evaluation and served as the one control. The dispersion made with Polymer Dispersant 2 gave a basepoint for existing technology. The other would be compared to this reference in both dispersion and paint performance.

The dispersion formulations, (Ex.1 and CEx.2), had the following compositions:

| | Ex.1 | CEx.2 |
|---|---|---|
| Deionized Water | 18.65 | 16.40 |
| R-706, TiO2 Pigment | 75.00 | 75.00 |
| Polymer Dispersant 1 | 2.00 (62% solids) | 0.00 |
| Polymer Dispersant 2 | 0.00 | 4.25 (30% solids) |
| Cosolvent, (PnP) | 4.00 | 4.00 |
| Defoamer | 0.30 | 0.30 |
| Aminomethyl propanol | 0.05 | 0.05 |
| Total | 100.00 | 100.00 |
| Dispersion Test Results: | | |
| pH | 9.0 | 8.8 |
| Brookfield Viscosity (centipoise) | | |
| @ 5 rpm | 5,440 | 10,040 |
| @ 100 rpm | 1,080 | 1,600 |

-continued

| | Ex.1 | CEx.2 |
|---|---|---|
| Drawdown Gloss | | |
| @ 20 degrees | 93 | 17 |
| @ 60 degrees | 118 | 85 |
| @ 85 degrees | 103 | 67 |
| Paint Test Results | | |
| Basecoat/Clearcoat Letdown Gloss | | |
| @ 20 degrees | 86 | 82 |
| @ 60 degrees | 92 | 88 |
| @ 85 degrees | 101 | 98 |

The experimental results above used a 75.00% R-706, $TiO_2$ white pigment concentration which provided adequate screening between samples. In analyzing Example 1 versus the control, the key attributes included: dispersion pH, viscosity and gloss and the paint letdown gloss. The desired attributes are: 1) high pigment loading, 2) low viscosity, and 3) high gloss for both dispersion and primarily, paint. The dispersion viscosity was measured with a standard Brookfield Viscometer at low shear, 5 rpm and a higher, low shear at 100 rpm. The gloss of the dispersion drawdown was measured at 20, 60 and 85 degrees using a standard BYK Gardner multiangle gloss meter. The drawdowns were made onto Mylar films using #30 Wire Wound Rods.

The balanced clear, BC-1, used in the paint evaluations contained the following composition:

| Balanced Clear, BC-1 | Weight Percent |
|---|---|
| Acrylic Latex (32.7% solids in an aqueous medium of polymer of allyl methacrylate/methyl methacrylate/methacrylic acid/hydroxy ethyl acrylate/butyl acrylate) | 58.40 |
| Water | 15.90 |
| Aminomethylpropanol | 0.32 |
| Polyester Solution (89% solids in butoxyethanol of a polyester of neopentyl glycol/trimethyl porpane/1,6 hexanediol/isophthalic acid/phthalic anhydride/adipic acid/1,12 dodecane dioic acid) | 5.96 |
| "Cymel" 301 (methylated melamine crosslinking agent from Cytec Industries) | 6.05 |
| Agitan 281 (defoamer) | 1.10 |
| Mineral Spirits | 6.60 |
| Butoxyethanol | 1.66 |
| Hexoxyethanol | 2.94 |
| Nacure XP-221 (aromatic sulfonic acid catalyst) | 0.12 |
| ASE-60 (acrylic emulsion polymer thickener) | 0.95 |
| Total | 100.00 |

The paint evaluations were performed by adding 14 grams of dispersion to 20 grams of balanced clear, BC-1, mixing thoroughly, and drawing the paint onto Mylar film with a # 20 WWR, (Wire Wound Rod) applicator. After the film dried, an automotive Clearcoat was applied over the basecoat film also with a # 20 WWR. The sample was oven cured at 250° F. for 30 minutes. After cooling, the gloss at 20, 60 and 85 degrees was read using a conventional BYK Gardner Glossmeter. The procedure for dispersion letdown and quality assessment is more fully described in Dupont Co. Wilmington, Del., test procedure, TM-501A.

Dispersant levels in above formulations, (Ex and CEx), were adjusted based on solution solids to be equal amounts in all formulations.

Example 1

The use of Polymer Dispersant 1 gave superior dispersion performance versus the control, CEx.2 results. The new dispersant had significantly lower viscosity, indicating improved pigment stabilization. The dispersion gloss was higher which also indicates improved pigment stabilization. The paint letdown results showed slightly higher gloss versus the control, CEx.2.

Comparison Example 2

The use of Polymer Dispersant 2 was chosen as the control, CEx.2. This dispersing polymer is very effective in stabilizing $TiO_2$, White pigments and represents the basepoint for existing commercial technology. Use of combination anionic and nonionic stabilizing arms on dispersing polymer showed favorable improved dispersion and paint performance versus 100% anionic arms.

Polymer Dispersant 3

Polymer Dispersant 3 is a graft copolymer prepared in the same manner as Polymer Dispersant 1. The resulting Polymer is a 50/50 blend of anionic and nonionic arms. The anionic macromonomer is BMA/MMA/HEMA/MAA (40/28/12/20). The nonionic macromonomer is Bisomer S20W, which is methoxy polyethylene glycol monomethacrylate of 2000 weight average molecular weight. The polymer differs from Polymer Dispersant 1 in backbone composition which is the adsorbing portion. Polymer Dispersant 2 incorporates aromatic and amino functional polymers for selective interaction with pigments with acidic surfaces and affinity for aromatic functionality. The polymer has the following composition: [60] BA/BZMA/DMAEMA/(50/30/20)//[40] BMA/MMA/HEMA/MAA (40/28/12/20)/Bisomer S20W (50/50). The resulting branched copolymer is 42% solids in a solution of water, methyl ethyl ketone and isopropanol. The monomer "BZMA" is benzyl methacrylate and "DMAEMA" is dimethyl amino ethyl methacrylate.

Example 3

Crude N-N-dimethylperylenediimide pigment (C.I. Pigment Red 179) was milled together with a neutralized aqueous solution of Polymer Dispersant 3 to form an aqueous pigment dispersion. The use of Polymer Dispersant 3 showed good dispersion performance as well as good paint performance. Polymer Dispersant 3 has aromatic and amino functional groups in the backbone which are favorable for use on pigment surfaces that are acid in character or have aromatic functional groups in its crystalline structure, such as organic perleyne pigments.

Various modifications, alterations, additions or substitutions of the components of the compositions of this invention will be apparent to those skilled in the art without departing from the spirit and scope of this invention. This invention is not limited by the illustrative embodiments set forth herein, but rather is defined by the following claims.

What is claimed is:

1. A composition suitable for use as a pigment dispersant, which comprises a graft copolymer, wherein the graft copolymer has a weight average molecular weight of about 5,000–100,000 and comprises a polymer backbone and discrete anionic and nonionic hydrophilic side chain(s) attached to the backbone wherein (1) the polymer backbone is hydrophobic in comparison to the side chains and contains polymerized ethylenically unsaturated hydrophobic monomers and up to 30% by weight, based on the total weight of the backbone, of polymerized ethylenically unsaturated monomers having functional groups that enhance the pigment binding force;

(2) the anionic side chain(s) are hydrophilic macromonomers that are formed from polymerized ethylenically unsaturated monomers and contain 2–100% by weight, based on the total weight of the anionic side chain(s), of polymerized ethylenically unsaturated acid containing monomers;

(3) the nonionic side chain(s) are hydrophilic poly (alkylene glycol) containing ethylenically unsaturated macromonomers.

2. The composition of claim 1 wherein the acid groups of the graft copolymer are neutralized with an inorganic base or amine.

3. The composition of claim 1 wherein the graft copolymer is formed from polymerized methacrylic and/or acrylic monomers.

4. The composition of claim 1 wherein the functional groups are selected from the group consisting of acid groups and amino groups.

5. The composition of claim 1 wherein the anionic side chain(s) further contain hydroxyl groups.

6. The composition of claim 1 wherein the nonionic side chain(s) further contain hydroxyl groups.

7. A composition suitable for use as a pigment dispersant, which comprises an acrylic graft copolymer, wherein the graft copolymer has a weight average molecular weight of about 10,000–40,000 and comprises a hydrophobic polymer backbone and discrete anionic and nonionic hydrophilic side chain(s) attached to the backbone wherein (1) the polymer backbone is hydrophobic in comparison to the side chains and is formed from polymerized hydrophobic (meth)acrylic monomers and contains up to 30% by weight, based on the total weight of the backbone, of polymerized monomers having functional groups that enhance the pigment binding force;

(2) the anionic side chain(s) are hydrophilic (meth)acrylic macromonomers that are formed from polymerized (meth)acrylic monomers and contain about 2–100% by weight, based on the total weight of the anionic side chain(s), of polymerized acid containing monomers and have a weight average molecular weight of about 2,000–5,000;

(3) the nonionic side chain(s) are hydrophilic poly (ethylene and/or propylene glycol) containing (meth) acrylic macromonomers that are represented by the formula

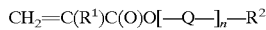

$CH_2=C(R^1)C(O)O[-Q-]_n-R^2$ wherein $R^1$ is H or $CH_3$, $R^2$ is H or an alkyl group of 1 to 4 carbon atoms, Q is $-CH_2CH_2O-$, $-CH(CH_3)CH_2O-$, or a combination thereof, and n is about 10–100 and have a weight average molecular weight of about 550–4,000; and wherein the acid groups of the graft copolymer are neutralized with an inorganic base or amine.

8. The composition of claim 7 wherein the graft copolymer is formed from polymerized methacrylic and/or acrylic monomers.

9. The composition of claim 7 wherein the nonionic side chain(s) are hydrophilic poly(ethylene glycol) (meth)acrylic macromonomers that are represented by the formula

$CH_2=C(R^1)C(O)O(CH_2CH_2O)_n-R^2$ wherein $R^1$=H or $CH_3$, $R^2$=H or $CH_3$, and n is about 10–100 and have a weight average molecular weight of about 550–4,000.

10. The composition of claim 7 wherein the functional groups in the backbone are selected from the group consisting of acid groups and amino groups.

11. The composition of claim 7 wherein the anionic side chains further contain hydroxyl groups.

12. The composition of claim 7 wherein the graft copolymer comprises about 50–90% by weight of polymeric backbone and correspondingly about 10–50% by weight of macromonomer side chains.

13. The composition of claim 7 wherein the weight ratio of anionic to nonionic side chains is about 10:90 to 90:10.

14. A pigment dispersion comprising a pigment, organic solvent, and a pigment dispersant having the composition of claim 2.

15. A pigment dispersion comprising a pigment, aqueous liquid carrier, and a pigment dispersant having the composition of claim 7.

16. A water-borne coating composition comprising a film-forming polymer, a crosslinking agent, an aqueous liquid carrier, pigment, and a pigment dispersant having the composition of claim 2.

17. A water-borne coating composition comprising a film-forming polymer, a crosslinking agent, an aqueous liquid carrier, a pigment, and a pigment dispersant having the composition of claim 7.

* * * * *